United States Patent
Richards-Greaves (10) Patent No.: US 11,358,532 B2
(45) Date of Patent: Jun. 14, 2022

(54) PORTABLE DASH POUCH

(71) Applicant: Gillian Richards-Greaves, Conway, SC (US)

(72) Inventor: Gillian Richards-Greaves, Conway, SC (US)

(73) Assignee: Gillian Richards-Greaves, Conway, SC (US)

( * ) Notice: Subject to any disclaimer, the term of this patent is extended or adjusted under 35 U.S.C. 154(b) by 99 days.

(21) Appl. No.: 17/015,394

(22) Filed: Sep. 9, 2020

(65) Prior Publication Data

US 2022/0073006 A1    Mar. 10, 2022

(51) Int. Cl.
 *B60R 7/06* (2006.01)
 *B60R 7/08* (2006.01)
 *B60R 11/00* (2006.01)

(52) U.S. Cl.
 CPC ............. *B60R 7/06* (2013.01); *B60R 7/08* (2013.01); *B60R 2011/0005* (2013.01); *B60R 2011/0057* (2013.01); *B60R 2011/0075* (2013.01)

(58) Field of Classification Search
 CPC ..... B60R 7/06; B60R 7/08; B60R 2011/0005; B60R 2011/0057; B60R 2011/0075
 USPC ...................................... 296/37.12
 See application file for complete search history.

(56) References Cited

U.S. PATENT DOCUMENTS

| | | | | |
|---|---|---|---|---|
| 5,573,164 | A * | 11/1996 | Law ................. | B60R 7/06 224/483 |
| 2016/0195180 | A1* | 7/2016 | Castillo ............. | E05F 5/02 296/37.12 |
| 2020/0369223 | A1* | 11/2020 | Hansen ............. | B32B 9/045 |
| 2021/0114205 | A1* | 4/2021 | Cristache .......... | G06K 7/10366 |
| 2021/0362656 | A1* | 11/2021 | Harbin .............. | B42F 1/00 |

FOREIGN PATENT DOCUMENTS

| | | | | |
|---|---|---|---|---|
| DE | 102019202532 | A1 * | 8/2020 | ............. B60R 7/06 |
| EP | 2397371 | A1 * | 12/2011 | ............. B60R 7/06 |
| FR | 2715114 | A1 * | 7/1995 | ............. G09F 3/203 |
| FR | 3056166 | A1 * | 3/2018 | ............. B60R 7/06 |

* cited by examiner

*Primary Examiner* — Pinel E Romain
(74) *Attorney, Agent, or Firm* — NSIP Law (57) ABSTRACT

A dashboard pouch is provided. The dashboard pouch ensemble includes a base tray, configured to be detachably attached to an external surface, and a document pouch, configured to be inserted into a cavity of the base tray. The base tray includes a first cover, comprising a first end hingedly connected to a first side panel of the base tray, and a second end including one or more first fastening devices, and a second cover comprising a first end connected to the first side panel of the document pouch, and a second end connected to a second side panel of the base tray, and the second cover is configured to form a cavity with a base panel, side panels, and a rear panel of the base tray, wherein the second side panel includes one or more second fastening devices.

10 Claims, 9 Drawing Sheets

PORTABLE DASH POUCH

BACKGROUND

1. Field

The following description relates to a portable dashboard pouch.

2. Description of Related Art

Typically, holders or pouches that are used to hold or store documents such as vehicle registration cards, driver's licenses, certificates, etc., are stored on the body of a user, or may be stored in a closed compartment, for example, a console, of automobiles. Accordingly, it may be difficult, or dangerous for the user of the automobile to quickly or safely retrieve the documents when the need arises, since reaching for the documents in a pocket of the user, or from a console of the vehicle may be perceived as reaching for a weapon.

Additionally, it may be difficult for typical document holders to conform to the varied contours or shapes of the dashboards of different automobiles, thus preventing the typical document holders from being stably maintained on the dashboard or other portion of the vehicle to which they are attached.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a dashboard pouch ensemble includes a base tray, configured to be detachably attached to an external surface; and a document pouch, configured to be inserted into a cavity of the base tray; wherein the base tray includes a first cover, comprising a first end hingedly connected to a first side panel of the base tray, and a second end including one or more first fastening devices; and a second cover comprising a first end connected to the first side panel of the document pouch, and a second end connected to a second side panel of the base tray, and the second cover is configured to form a cavity with a base panel, side panels, and a rear panel of the base tray, wherein the second side panel includes one or more second fastening devices.

The first cover may be composed of a neon-colored material, and the second cover may be composed of a transparent material.

The first cover may be composed of a transparent material.

The base tray may further include one or more security devices configured to affix the base tray to the external surface.

The one or more first fastening devices of the first cover may be configured to connect to the one or more second fastening devices of the second side panel.

The base tray may further include a magnetic strip attached to a rear panel of the base tray.

The document pouch may include a plurality of card holders integrally connected to a side of the document pouch.

The document pouch may include a magnetic strip attached to a rear surface of the document pouch.

An upper surface of the document pouch may be formed of a transparent material.

The one or more first fastening devices may be disposed on an inner surface of the first cover.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Figure 1:
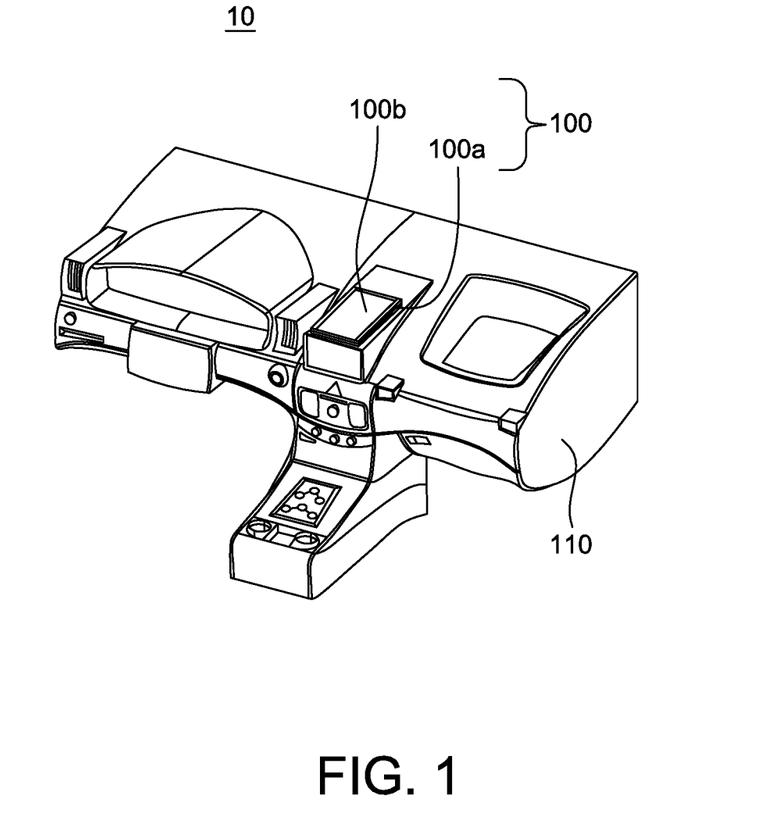
FIG. 1 illustrates an example implementation of a dashboard pouch ensemble, in accordance with one or more embodiments.

FIG. 1 illustrates an example implementation 10 of a dashboard pouch ensemble, in accordance with one or more embodiments.

Referring to FIG. 1, an example dashboard pouch ensemble 100, in accordance with one or more embodiments, may be attached to a dashboard 110 of an automobile. In an example, the dashboard pouch ensemble 100 may include a base tray or base housing 100a, and a removable or detachable document pouch 100b. The base tray 100a may be secured to the dashboard 110 using, as non-limiting example, one or more fasteners, for example adhesive strips. However, this is only an example, and, in a non-limiting example, the base tray 100a may be secured to the dashboard 110 using magnetic strips. However, this is only a non-limiting example, and herein, any adhering or securing mechanism, e.g., which does not scratch or deface the surface of the dashboard 110, may be implemented to secure the base tray 100a to the dashboard 110.

In an example, the location of the dashboard pouch ensemble 100 may be limited to the dashboard 110 of the vehicle, and preferably on the driver's side of the dashboard 110. However, instead of being positioned on the dashboard 110 of the vehicle, the dashboard pouch ensemble 100 may be positioned on, for example, the middle console of the vehicle, between a driver's seat and a front passenger seat. Accordingly, the dashboard pouch ensemble 100 may be located in an area of the vehicle that is within easy access of a user.

The location of the dashboard pouch ensemble 100 may be such that any documents placed within the document pouch 100b may be easily visible to a viewer. Specifically, the mounting of the dashboard pouch ensemble 100 on the upper surface of the dashboard 110 of a vehicle such as, but not limited to, an automobile, motorcycle, boat, or airplane, may provide security for the documents being stored in the document pouch 100b, and allow easy visible access to the documents without the user having to access the documents from a pocket of the user, or from a purse or other area of the vehicle, an action that may be deemed to be threatening to third parties.

Figure 2:
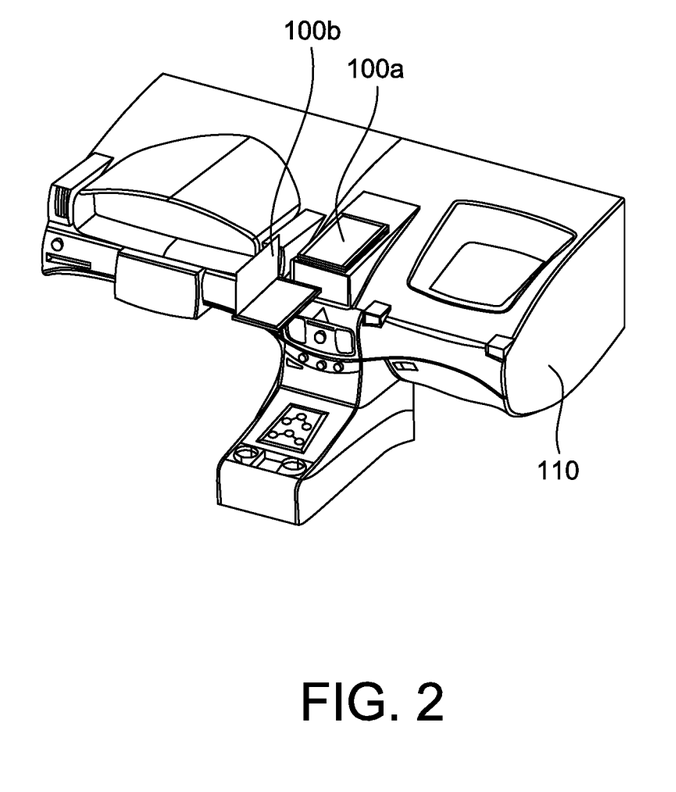
FIG. 2 illustrates an example implementation of a dashboard pouch ensemble, in accordance with one or more embodiments.

FIG. 2 illustrates an example dashboard pouch ensemble, in accordance with one or more embodiments.

Referring to FIG. 2, the base tray or housing 100a of the dashboard pouch ensemble 100 may be attached or secured to the dashboard 110 of the automobile. Specifically, the base tray 100a may be secured to the dashboard 110 using, as non-limiting examples, one or more security devices such as, for example, one or more adhesive strips or magnetic strips. The adhesive strips may include, but are not limited to pressure sensitive adhesives, rubber adhesives, urethanes, acrylics, and silicone adhesives. The security devices may also include, as non-limiting examples, VELCRO strips or any suitable hook and loop fasteners or adhesive strips that would allow for the easy removal of the dashboard pouch ensemble 100 from a corresponding surface, or that would allow the easy repositioning of the dashboard pouch ensemble 100 to different parts of the dashboard 110, or from one vehicle to another.

In a non-limiting example, portions of the base tray 100a may be composed of a plastic or a rubber material. However, the composition of the base tray 100a is not limited thereto.

Still referring to FIG. 2, the document pouch 100b may be easily attached to, or detached from, the base tray 100a, while the base tray 100a is secured to the dashboard 110. This may allow for the easy retrieval of necessary or requested documents during, for example, a traffic stop.

Figure 3:
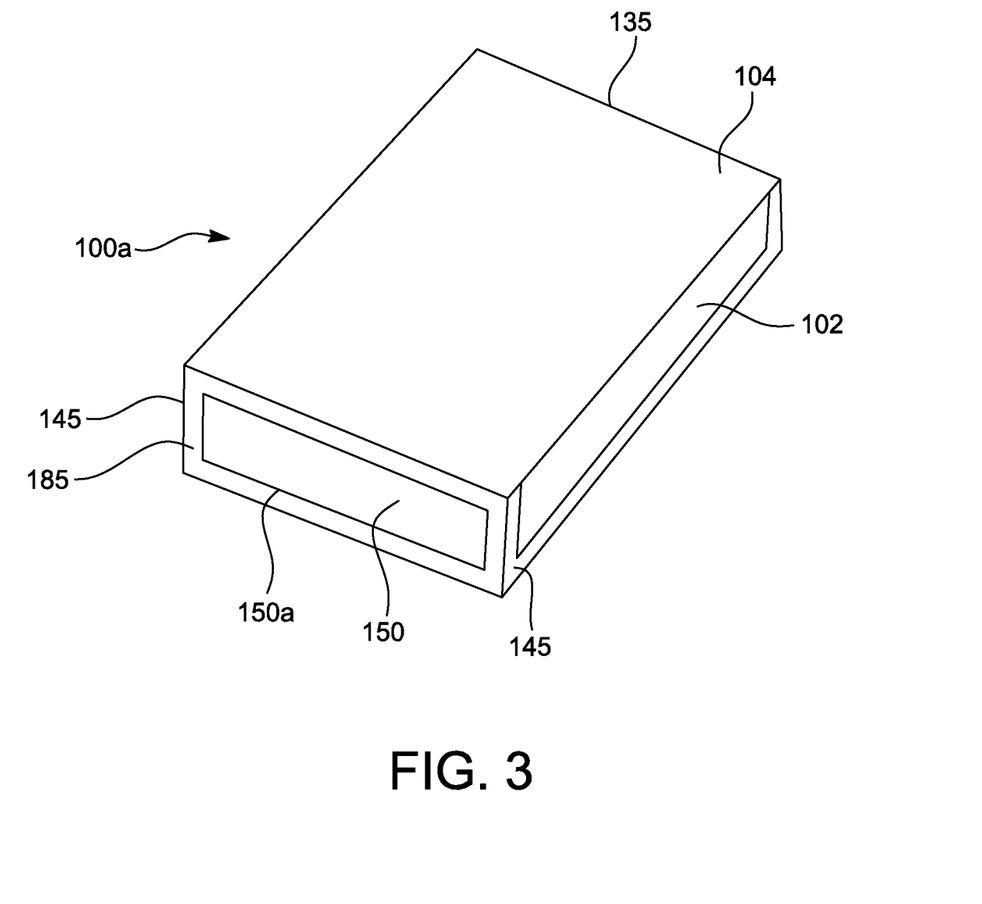
FIG. 3 illustrates an example base tray, in accordance with one or more embodiments.

FIG. 3 illustrates an example base tray 100a, in accordance with one or more embodiments.

Figure 4:
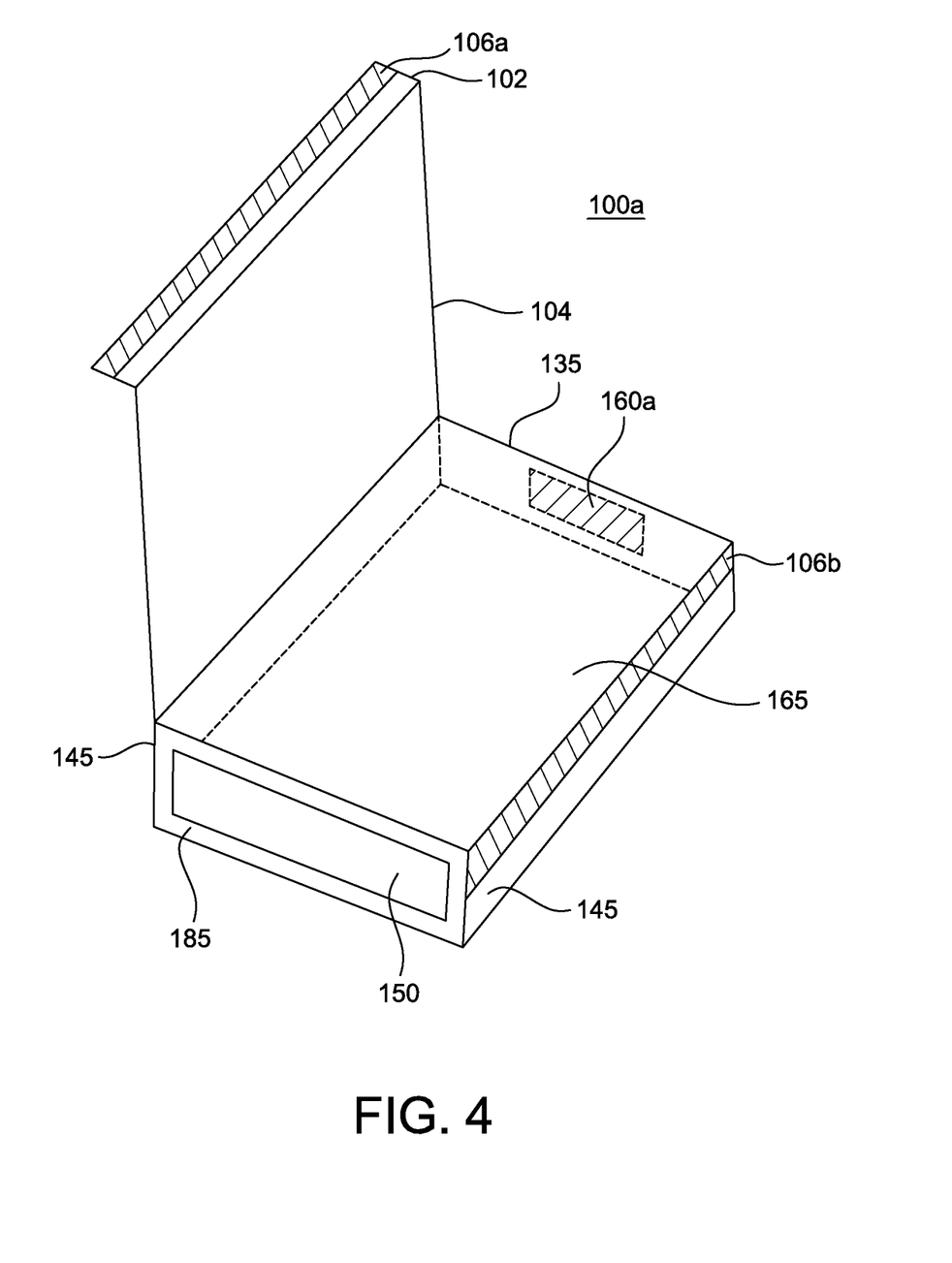
FIG. 4 illustrates an example base tray, in accordance with one or more embodiments.

Referring to FIG. 3, the example base tray 100a may have a polygonal shape, e.g., a rectangular shape. The base tray 100a may include a hollow body 150, that may be formed from, or enclosed by, a rear panel 135, opposing side panels 145, a base portion 155 (FIG. 5), and an upper panel 165 (FIG. 4). The hollow body 150 may be compact enough to allow the ingress and egress of the document pouch 100b. Additionally, in such an example, the hollow body 150 may be a rectangular cavity that is configured to receive the document pouch 100b through an opening 150a which faces the user. The opening 150a may facilitate the insertion or removal of the document pouch 100b. The hollow body 150 may have a size that is slightly larger than an overall size of the document pouch 100b, in order to allow easy insertion and removal of the document pouch 100b from the base tray 100a. For example, the document pouch 100b may be correspondingly polygonal, e.g., rectangular.

In an example, the upper panel 165 may be covered by a detachable brightly colored, for example, neon-colored, flap 104. The flap 104 may allow the document pouch ensemble 100 to be easily detected or recognized, for example through the windshield of the vehicle. In a non-limiting example, the brightly colored flap 104 may be composed or formed of a transparent plastic material. One end of the flap 104 may be integrally hinged or connected to the upper portion of one of the side panels 145, and a second end 102 of the flap 104 may be detachably attached to the other of the side panels 145. In an example, the second end 102 of the flap 104 may be detachably attached to the other side panel 145 by corresponding fastening devices.

In a non-limiting example, the flap 104 may be composed of, or formed of, a reflective or fluorescent material that is configured to shine or illuminate when the dashboard pouch ensemble 100 is disposed in dark conditions or is being implemented at night. The reflectivity of the flap 104 may allow for the easy visual recognition of the presence of the dashboard pouch ensemble 100 through, for example, a windshield of a vehicle.

The flap 104 may enclose the hollow body 150, and may add a protective layer or covering for the document pouch 100b when the document pouch 100b is inserted into the base tray 100a.

FIG. 4 illustrates an example base tray 100a, in accordance with one or more embodiments.

Referring to FIG. 4, the base tray 100a may include an upper panel 165 that is integrally connected to upper surfaces of the rear panel 135, the side panels 145 and the front face 185 of the base tray 100a. In an example, the upper panel 165 is a transparent plastic cover that is combined with the rear panel 135, the side panels 145 and the front face 185 to form the hollow body 150. The formation of the upper panel 165 in a transparent plastic material allows the documents that are stored in the document pouch 100b to be easily viewed from an external position.

In an example, one of the side panels 145 may include a fastening device 106b that is attached to at least a portion of the side panel 145. The fastening device 106b that is attached to the side panel 145, may spatially correspond with fastening device 106a that is attached to an upper portion 102 of the flap 104. When the flap 104 overlays the upper flap 165, the fastening device 106a may be attached to the corresponding device 106b in order to secure the flap to the side panel 145.

The rear panel 135 may be disposed in a perpendicular manner to the base 155 of the base tray 100a, and may abut an end portion of the opposing side panels 145. The rear panel 135 may be disposed to face the windshield of a vehicle when the dashboard pouch ensemble 100 is attached to a surface, for example, a dashboard 110.

In a non-limiting example, the rear panel 135 may include a magnetic strip 160a. The magnetic strip 160a may be disposed at a position or location of the rear panel 135 that is adjacent to a corresponding magnetic strip 160b that is secured to a portion of the document pouch 100b that faces, or is adjacent to, the magnetic strip 160a of the base tray 100a when the document pouch 100b is inserted into the base tray 100a. The corresponding magnetic strips 160a and 160b may add greater stability and security to the document pouch 100b, and may prevent the document pouch 100b from being ejected from the base tray 100a when inserted therein. For example, the document pouch 100b may be compressibly encouraged from being ejected or displaced from the base tray 100a merely due to abrupt changes in movement of the vehicle, such as due to rapid acceleration or rapid deceleration, or a vehicular accident.

The base tray 100a may be formed, as a non-limiting example, from a light, durable plastic material, for example, injection molded plastic. The base tray 100a may be made from a material which renders the base tray 100a flexible, which may allow the dashboard pouch ensemble 100 to easily conform to the varied shapes or contours of the dashboards of different vehicles, or to different locations of the same vehicle.

In a non-limiting example, the base tray 100a may be formed of a lightweight metallic material, which may result in a more durable and sturdy form factor.

Figure 5:
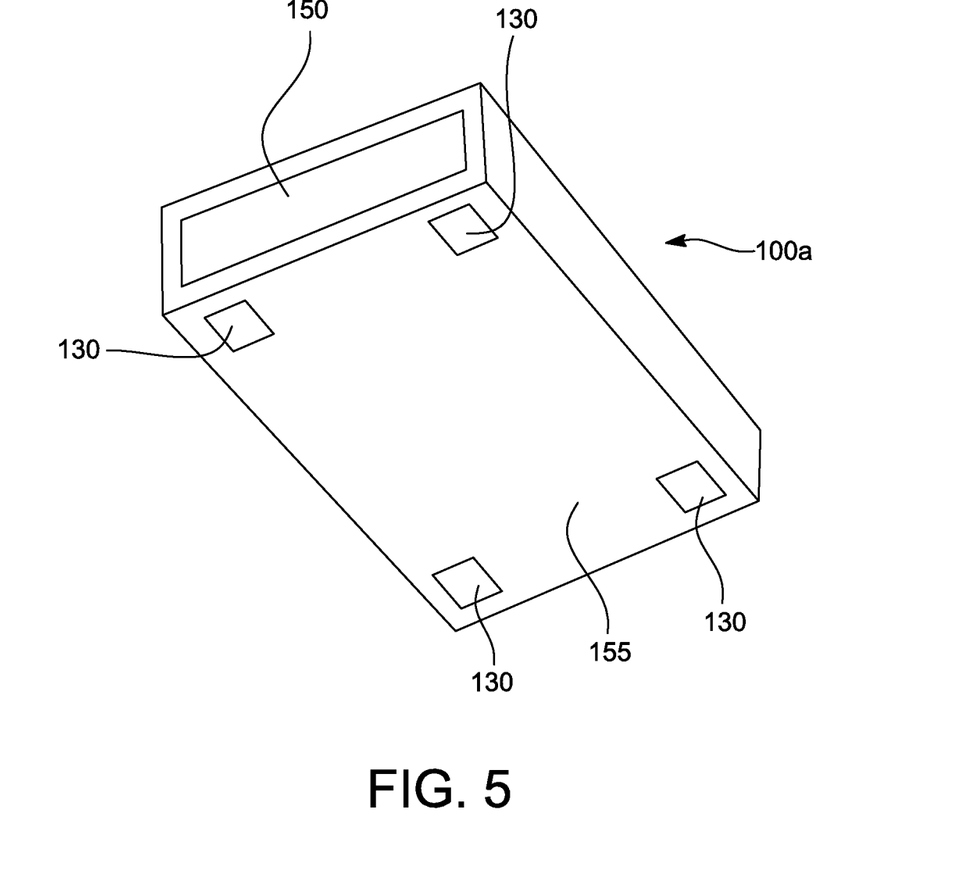
FIG. 5 illustrates an example base tray, in accordance with one or more embodiments.

FIG. 5 illustrates an example base tray 100a, in accordance with one or more embodiments.

Referring to FIG. 5, security devices 130 may be connected to the base portion 155 of the base tray 100a. The security devices may include, as non-limiting examples, adhesive strips or magnetic strips. In an example, the security devices may be attached in a spaced apart manner at adjacent corners of the rear face or surface of the base portion 155. However, this is only an example, and the security devices may be implemented as two single rectangular pieces disposed at opposing ends of the rear face or surface of the base portion 155, or may be implemented as a single strip disposed at a central portion of the rear face or surface of the base portion 155, as non-limiting examples.

In an example, the security devices 130 may be composed of a flexible rubber or synthetic material. Although not shown, the base portion 155 may include indented portions or reservoirs at adjacent corners of the base portion 155, and each of the security devices 130 may be inserted into each of the indented portions in order to ensure that the base tray 100a maintains a slim form factor. The placement of the indented portions at adjacent corners of the rear surface of the rear surface of the base portion 155 is only an example, and an indented portion may be disposed at a substantially central location of the rear surface of the base portion 155 to accommodate a single security therein.

In a non-limiting example, the base portion 155 may be transparent or opaque, based on a desired manufacturing material.

In an example, when mounted on, for example, the vehicular dashboard 110, the base tray 100a may be held in a position that is substantially horizontal to the long axis of the vehicular dashboard 110, which may also allow any documents stored in the base tray 100a to be easily viewed through the windshield from a position outside of the vehicle, thus eliminating the need for a user to have to retrieve these documents from a pocket, purse, or console of the vehicle.

Figure 6:
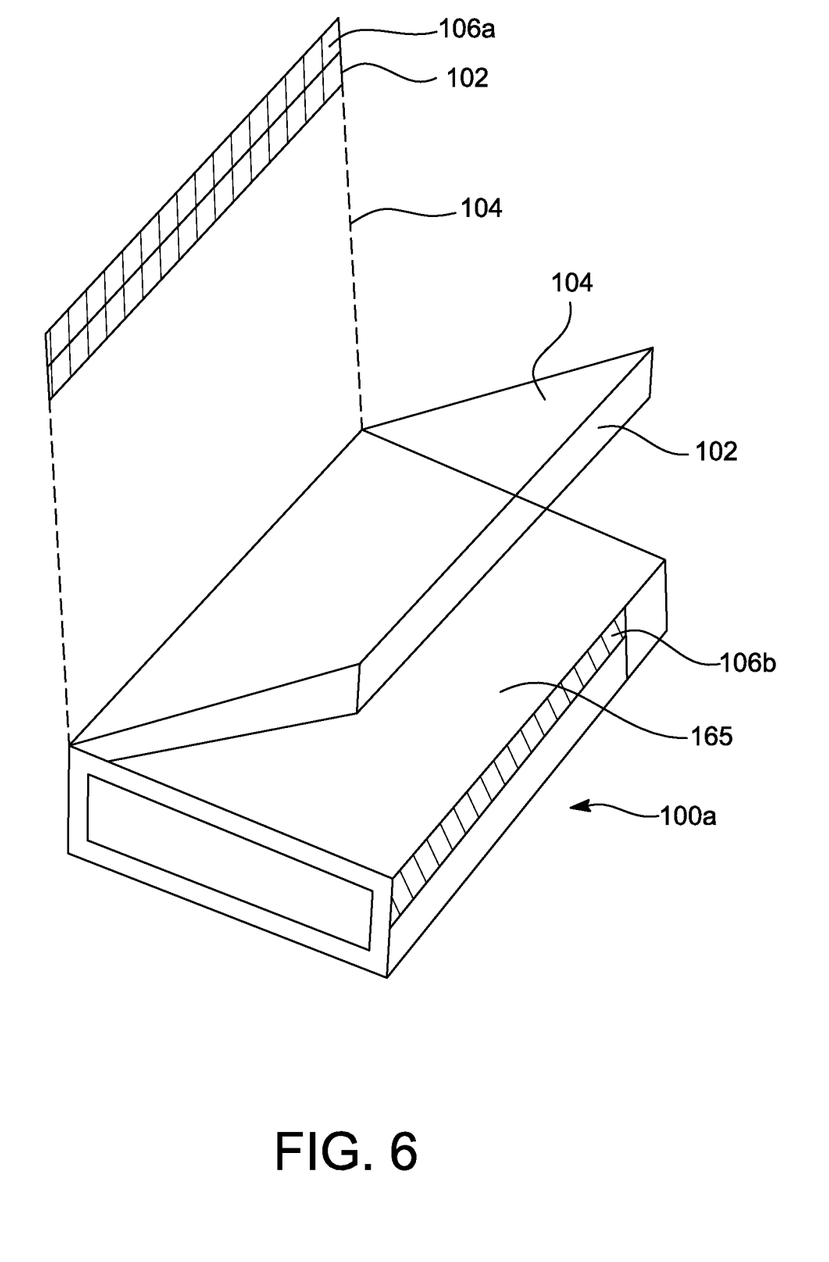
FIG. 6 illustrates an example base tray, in accordance with one or more embodiments.

FIG. 6 illustrates an example base tray 100a, in accordance with one or more embodiments.

Referring to FIG. 6, the brightly colored (for example, neon-colored) flap 104 may be detachably attached to the body of the base tray 100a by using the corresponding fastening devices 106a and 106b. The flap 104 may overlay the transparent cover 165 in order to add greater protection and security to documents stored in the document pouch 100b.

Figure 7:
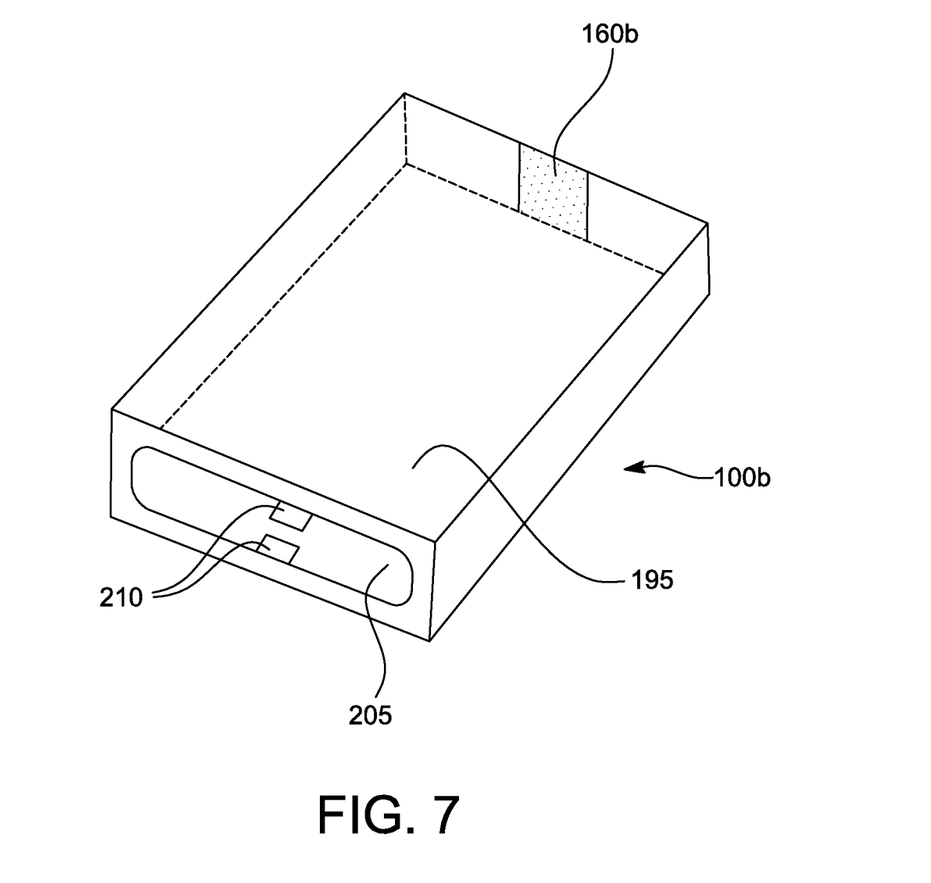
FIG. 7 illustrates an example document pouch, in accordance with one or more embodiments.
Figure 8:
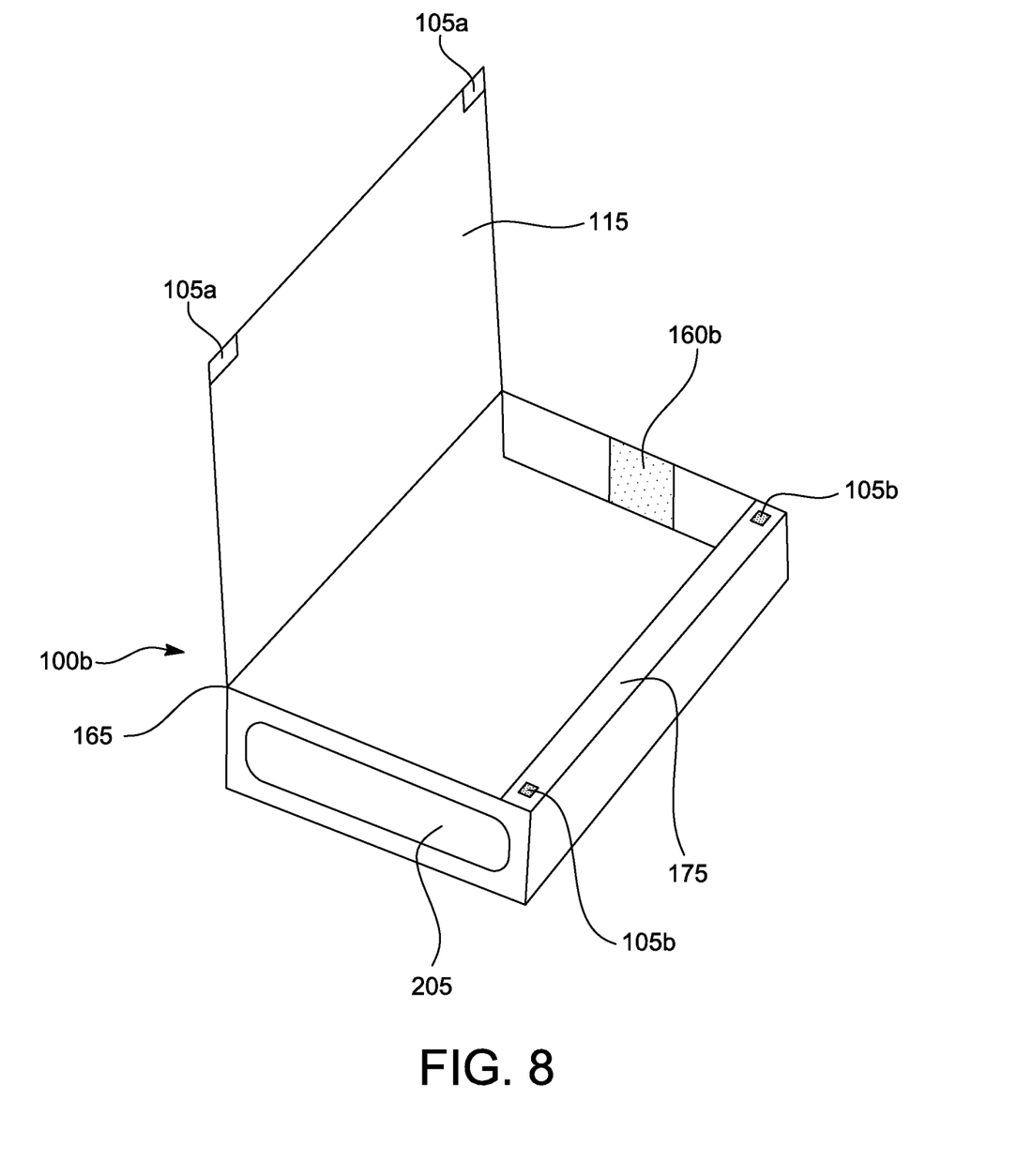
FIG. 8 illustrates an example document pouch, in accordance with one or more embodiments.

FIGS. 7 and 8 illustrate an example document pouch 100b, in accordance with one or more embodiments.

Referring to FIG. 7, the document pouch 100b may include a magnetic strip 160b that is disposed to face, or be adjacent to, the magnetic strip 160a of the base tray 100a when the document pouch 100b is inserted into the base tray 100a. An upper surface 195 of the document pouch 100b may be formed of a transparent plastic material which allows one or more documents that are stored in the document pouch 100b to be readily viewed. Accordingly, since the detachable flap 104 of the base tray 100a, the upper panel 165 of the base tray 100a and the upper surface 195 of the document pouch 100b may all be formed of a transparent material, documents that are stored in the document pouch 100b may be easily viewed when the document pouch 100b is inserted into the base tray 100a. However, this is only an example, and the flap may not be formed of a transparent material, but may instead be formed of a brightly colored opaque material in order to protect the privacy and security of the document that are stored in the document pouch 100b.

In an example, the document pouch 100b may include a plurality of card holders disposed beneath the cover 195, and one end of each of the plurality of card holders may be connected to one end of the document pouch.

In an example, the document pouch 100b may include an opening 205 through which one or more documents may be inserted. As non-limiting examples, the documents may include driver's licenses, vehicle registration documents, and vehicle insurance verification cards.

In a non-limiting example, a clasp or other securing device 210 may be disposed adjacent to the opening 205 of the document pouch 100b in order to prevent the one or more documents stored in the document pouch 100b from being ejected.

Referring to FIG. 8, in a non-limiting example, the document pouch 100b may be formed of a two-part structure. However, this is only an example, and as discussed above, the document pouch 100b may be formed in a single integral structure.

In a non-limiting example, the document pouch 100b may include a detachable cover 115. While inserted in the base tray 100a, the document pouch 100b may be closed, and the cover 115 may be fastened to an end of the document pouch 100b using fastening devices 105a and 105b, thus protecting the documents therein. In an example, the cover 115 may be composed of a brightly colored, transparent material, in order to allow documents or cards that are inserted in the document pouch 100b to be viewed by a viewer through the windshield of the vehicle. The documents that are stored in the document pouch 100b may be viewed when the cover 115 is lifted, and may also be viewed through the transparent cover 115.

In an example, the cover or flap 115 of the document pouch 100b may be composed or implemented of a highly visible and reflective material that may make the document pouch 100b easily visible, especially at night. In an example, the document pouch 100b may be composed of a neon colored material or other brightly colored reflective material that makes the document pouch 100b highly visible.

Referring to FIG. 8, the cover or flap 115 may be implemented as a hinged panel, that may be lifted up from, or attached to, the body of the document pouch 100b.

In an example, the cover or flap 115 of the document pouch 100b may be hinged to a first side or end 165 of the document pouch 100b, and may be lifted to allow documents to be placed into the document pouch 100b. The cover or flap 115 may be secured to a second end or side 175 of the document pouch 100b using corresponding fasteners or fastening devices 105a and 105b. The fastening devices 105a may be secured or attached to an inner surface of cover or flap 115, and the fastening devices 105b may be attached to the second end 175 of the document pouch 120b. The respective fastening devices 105a and 105b may be disposed in direct correspondence to each other in order to be detachably fastened to each other.

In a non-limiting example, the document pouch 100b may include a plurality of separate, individual card holders, which are configured to accommodate individual cards or documents. In an example, one end of each of the plurality of card holders may be integrally connected to a first end 165 of the document pouch 100b. The plurality of separate, individual card holders may be disposed beneath the cover 115 when the cover 115 is fastened to the side 175 of the document pouch 100b using the fasteners 105a/105b. The separate, individual card holders may each be composed of a plastic material, and include an opening for the insertion of individual cards or documents.

Figure 9:
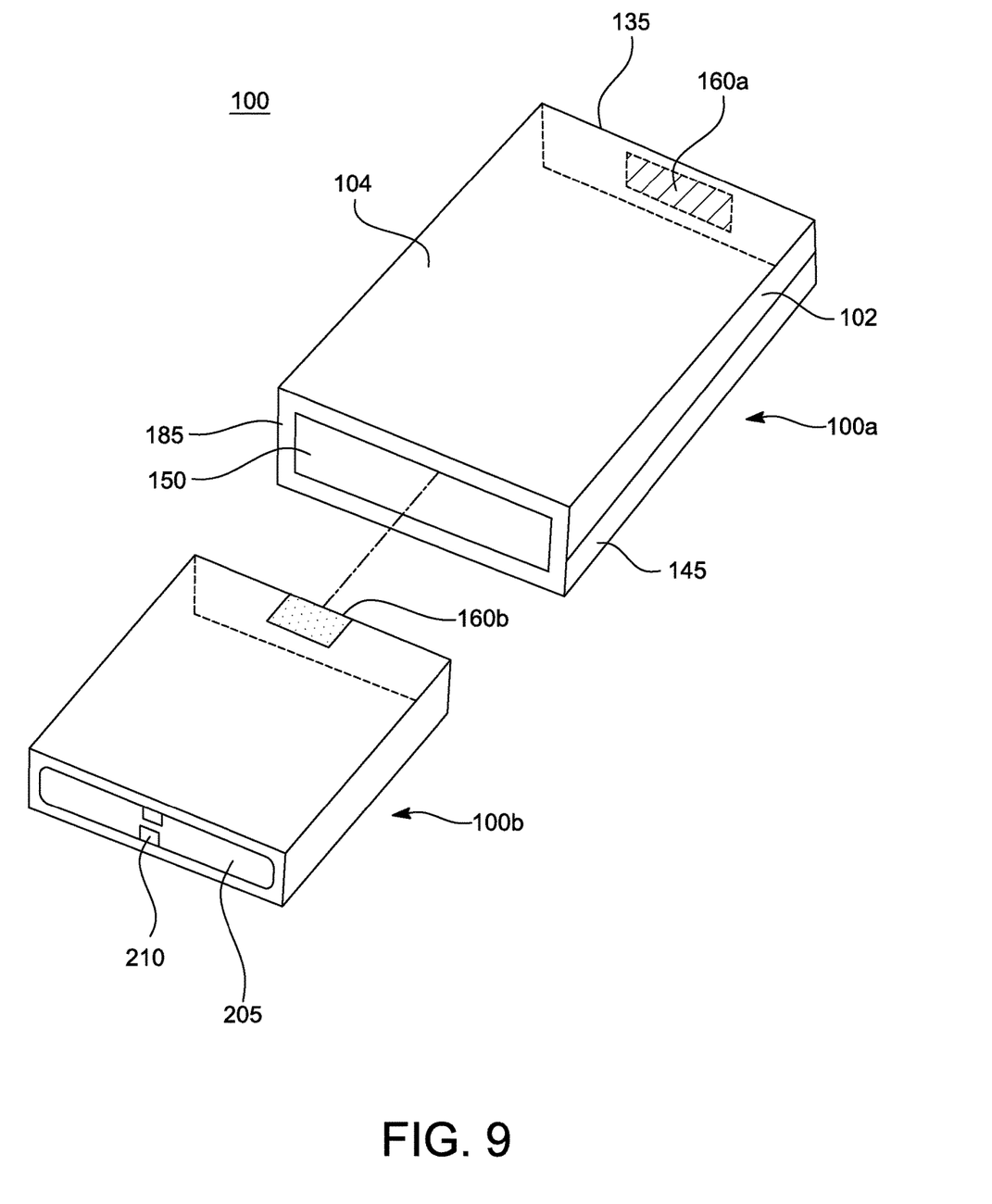
FIG. 9 illustrates an example dashboard pouch ensemble, in accordance with one or more embodiments.

FIG. 9 illustrates an example document pouch ensemble 100, in accordance with one or more embodiments.

Referring to FIG. 9, the dashboard pouch ensemble 100 may include the base tray 100a and the document pouch 100b. The base tray 100a may remain attached to an intended surface, for example, a vehicular dashboard 110 using the security devices 130, and the document pouch 100b may be extracted from the base tray 100a, while the base tray 100a remains affixed to the surface, for example, the dashboard 110.

The base tray 100a may include a brightly colored (for example, a neon-colored) flap 104 that overlays a transparent upper panel 165 that forms a partially enclosed hollow body 150 in conjunction with a rear panel 135, side panels 145, and a base panel 155. A magnetic strip 160b may be attached to the rear surface 135 of the base tray 100a to correspond with magnetic strip 160a that is attached to a rear surface of the document pouch 100b.

As set forth above, according to each example, a two-piece dashboard pouch that is configured to be attached or detached to and from a vehicular dashboard provides easy visual access to documents therein, noting that the term "document" used herein is not limited to paper media, but may include other mediums or articles having viewable content.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A dashboard pouch ensemble comprising:
   a base tray, configured to be detachably attached to an external surface; and
   a document pouch, configured to be inserted into a cavity of the base tray;
   wherein the base tray comprises:
      a first cover, comprising a first end hingedly connected to a first side panel of the base tray, and a second end including one or more first fastening devices; and
      a second cover comprising a first end connected to the first side panel of the document pouch, and a second end connected to a second side panel of the base tray, and the second cover is configured to form a cavity with a base panel, side panels, and a rear panel of the base tray,
   wherein the second side panel includes one or more second fastening devices.

2. The dashboard pouch ensemble of claim 1, wherein the first cover is composed of a neon-colored material, and the second cover is composed of a transparent material.

3. The dashboard pouch ensemble of claim 2, wherein the first cover is composed of a transparent material.

4. The dashboard pouch ensemble of claim 1, wherein the base tray further comprises one or more security devices configured to affix the base tray to the external surface.

5. The dashboard pouch of claim 1, wherein the one or more first fastening devices of the first cover are configured to connect to the one or more second fastening devices of the second side panel.

6. The dashboard pouch ensemble of claim 1, wherein the base tray further comprises a magnetic strip attached to a rear panel of the base tray.

7. The dashboard pouch ensemble of claim 1, wherein the document pouch comprises a plurality of card holders integrally connected to a side of the document pouch.

8. The dashboard pouch ensemble of claim 1, wherein the document pouch comprises a magnetic strip attached to a rear surface of the document pouch.

9. The dashboard pouch of claim 8, wherein an upper surface of the document pouch is formed of a transparent material.

10. The dashboard pouch ensemble of claim 1, wherein the one or more first fastening devices is disposed on an inner surface of the first cover.

* * * * *